(12) United States Patent
Nagathil et al.

(10) Patent No.: US 8,751,413 B2
(45) Date of Patent: Jun. 10, 2014

(54) FUZZY LOGIC BASED SYSTEM MONITORING SYSTEM AND METHOD

(75) Inventors: Roopesh Bhaskaran Nagathil, Smyrna, GA (US); Dalero Winston Berkeley, Anderson, SC (US); David Lynn Linkenauger, Williamsburg, VA (US); Jason Fredrick Nichols, Virginia Beach, VA (US)

(73) Assignee: General Electric Company, Schenectady, NY (US)

( * ) Notice: Subject to any disclaimer, the term of this patent is extended or adjusted under 35 U.S.C. 154(b) by 373 days.

(21) Appl. No.: 13/190,747

(22) Filed: Jul. 26, 2011

(65) Prior Publication Data

US 2013/0031043 A1    Jan. 31, 2013

(51) Int. Cl.
*G06F 15/18*    (2006.01)

(52) U.S. Cl.
USPC ............................................................. 706/1

(58) Field of Classification Search
USPC ............................. 706/1–3, 11, 12, 14, 15, 62
See application file for complete search history.

(56) References Cited

U.S. PATENT DOCUMENTS

| | | | |
|---|---|---|---|
| 4,082,837 A | 4/1978 | Whelan | |
| 4,726,302 A | 2/1988 | Hein | |
| 4,779,412 A | 10/1988 | Deinert | |
| 5,139,757 A | 8/1992 | Topsoe | |
| 5,449,495 A | 9/1995 | Goto | |
| 5,516,497 A | 5/1996 | Speronello | |
| 5,527,755 A | 6/1996 | Wenski | |
| 5,566,092 A | 10/1996 | Wang et al. | |
| 5,576,970 A | 11/1996 | Goto | |
| 5,603,909 A | 2/1997 | Varner | |
| 5,660,799 A | 8/1997 | Motai | |
| 5,906,803 A | 5/1999 | Leppalahti | |
| 5,912,198 A | 6/1999 | Feitelberg | |
| 5,926,001 A | 7/1999 | Eguchi | |
| 6,006,170 A | 12/1999 | Marcantonio et al. | |
| 6,054,408 A | 4/2000 | Hums | |
| 6,092,367 A | 7/2000 | Dolling | |
| 6,098,011 A | 8/2000 | Scott | |
| 6,264,905 B1 | 7/2001 | Spokoyny | |
| 6,282,880 B1 | 9/2001 | Wallace | |

(Continued)

FOREIGN PATENT DOCUMENTS

| | | | |
|---|---|---|---|
| DE | 19618384 C2 | 1/1990 | |
| DE | 69309874 T2 | 9/1997 | |

(Continued)

OTHER PUBLICATIONS

Ballal, Makarand S., et al. "Adaptive neural fuzzy inference system for the detection of inter-turn insulation and bearing wear faults in induction motor.", 2007 Industrial Electronics, IEEE Transactions on 54.1 pp. 250-258.*

(Continued)

*Primary Examiner* — David Vincent
(74) *Attorney, Agent, or Firm* — Cantor Colburn LLP

(57) ABSTRACT

A bearing monitoring system includes at least one sensor, and a fuzzy logic enabled device operatively connected to the at least one sensor. The fuzzy logic enabled device includes a fuzzy logic rule set that is configured and disposed to determine a component condition based on an input from the at least one sensor.

31 Claims, 2 Drawing Sheets

(56) References Cited

U.S. PATENT DOCUMENTS

| | | |
|---|---|---|
| 6,590,362 B2 | 7/2003 | Parlos et al. |
| 6,620,393 B2 | 9/2003 | Spokoyny |
| 6,727,725 B2 | 4/2004 | Devaney et al. |
| 6,882,929 B2 | 4/2005 | Liang |
| 6,981,368 B2 | 1/2006 | van Nieuwstadt |
| 6,993,900 B2 | 2/2006 | Upadhyay |
| 7,056,478 B1 | 6/2006 | Rini |
| 7,093,427 B2 | 8/2006 | van Nieuwstadt |
| 7,182,927 B2 | 2/2007 | Tran |
| 7,323,036 B2 | 1/2008 | Boyden |
| 7,381,389 B2 | 6/2008 | Harada |
| 7,390,471 B2 | 6/2008 | Sobolevskiy |
| 7,393,511 B2 | 7/2008 | Tran |
| 7,396,517 B2 | 7/2008 | Lee |
| 7,676,285 B2 * | 3/2010 | Hoyte et al. .............. 700/52 |
| 2004/0236450 A1 * | 11/2004 | Bryant et al. .............. 700/108 |
| 2006/0045802 A1 | 3/2006 | Boyden |
| 2006/0182676 A1 | 8/2006 | Tran |
| 2007/0110643 A1 | 5/2007 | Sobolevskiy |
| 2007/0285843 A1 * | 12/2007 | Tran .............. 360/245.9 |
| 2007/0297963 A1 | 12/2007 | Cochran |
| 2008/0047259 A1 | 2/2008 | Frydman |
| 2008/0112870 A1 | 5/2008 | Moini |
| 2010/0169030 A1 * | 7/2010 | Parlos .............. 702/58 |

FOREIGN PATENT DOCUMENTS

| | | |
|---|---|---|
| DE | 19851041 A1 | 12/1999 |
| EP | 1005894 A1 | 6/2000 |
| EP | 0806236 B1 | 1/2003 |
| EP | 01625883 A1 | 2/2006 |
| KR | 0604236 B1 | 4/1997 |
| KR | 0148028 B1 | 12/1998 |
| WO | 2004048852 A1 | 6/2004 |

OTHER PUBLICATIONS

Search Report and Written Opinion from the corresponding EP Application No. 12176783, dated May 28, 2013.

Abu-Rub, H. et al., "Incipient bearing fault diagnostics for inverter fed induction motor drive using ANFIS", Proceedings of the 19th International Conference on Electrical Machines (ICEM' 10), Sep. 6, 2010, XP031779668.

Reichard, K.M. et al., "Application of sensor fusion and signal classification techniques in a distributed machinery condition monitoring system", Proceedings of the SPIE, Apr. 25, 2000, pp. 329-336, XP55063161.

Widodo, A. et al., "Application of relevance vector machine and survival probability to machine degradation assessment", Expert Systems with Applications, vol. 38, No. 3, Aug. 31, 2010, pp. 2592-2599, XP027456307.

* cited by examiner

FUZZY LOGIC BASED SYSTEM MONITORING SYSTEM AND METHOD

BACKGROUND OF THE INVENTION

The subject matter disclosed herein relates to the art of system monitoring and, more particularly, to a fuzzy logic based system for monitoring systems.

Many industrial installations employ various systems that require monitoring. For example, motor systems include bearings that facilitate relatively friction free rotation of internal rotating shafts. Large industrial motors will often times include two or more large bearings. Failure of one, another, or both bearing leads to costly down time. Accordingly, many industrial motors include sensors positioned to monitor the bearings. The sensors may monitor vibration, heat and other factors that may indicate a potential problem. Currently, bearing health monitoring system employ threshold based or two state criteria to determine bearing health. More specifically current systems provide an indication whether a bearing is good or whether a bearing has gone bad. Other systems, both mechanical and electrical, employ various components that are exposed to operating conditions that, over time, lead to component degradation and failure.

BRIEF DESCRIPTION OF THE INVENTION

According to one aspect of the exemplary embodiment, a monitoring system includes at least one sensor, and a fuzzy logic enabled device operatively connected to the at least one sensor. The fuzzy logic enabled device includes a fuzzy logic rule set that is configured and disposed to determine a condition of a component based on an input from the at least one sensor.

According to another aspect of the exemplary embodiment, a method of monitoring component condition using a set of fuzzy logic rules includes sensing with a sensor at least one parameter of a component, passing the at least one parameter of the component to a fuzzy logic enabled device, applying the set of fuzzy logic rules to the at least one parameter of the component, and determining a condition of the component based on the at least one bearing parameter.

According to yet another aspect of the exemplary embodiment, a motor system includes a rotating shaft having a first end portion that extends to a second end portion through an intermediate portion, a first bearing arranged at the first end portion of the shaft, and a second bearing arranged at the second end portion of the shaft, and a bearing monitoring system operatively coupled to one of the first and second bearings. The bearing monitoring system includes at least one sensor, and a fuzzy logic enabled device operatively connected to the at least one sensor. The fuzzy logic enabled device includes a fuzzy logic rule set that is configured and disposed to determine a condition of at least one of the first and second bearings based on an input from the at least one sensor.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
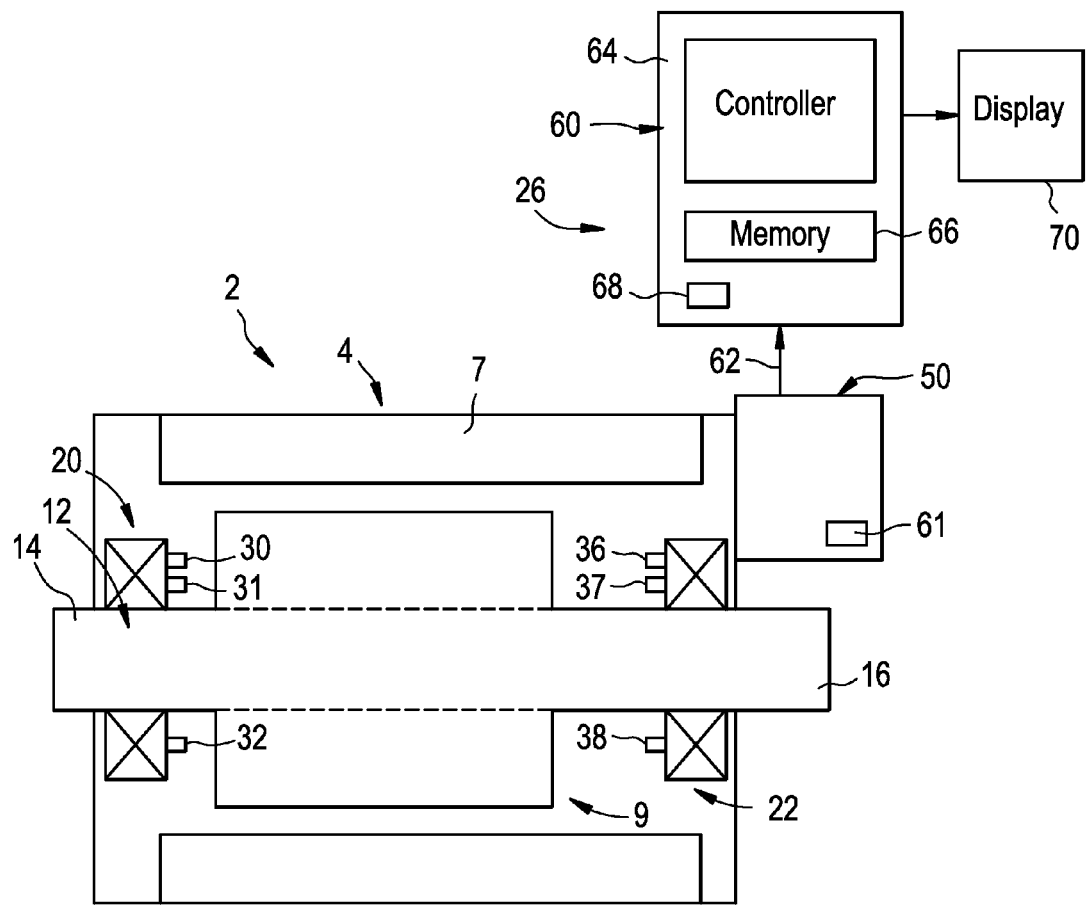
FIG. 1 is a cross sectional view of a motor including first and second bearings operatively connected to a bearing monitoring system in accordance with an exemplary embodiment.

With reference to FIG. 1, a rotating machine, shown in the form of an electric motor, is indicated generally at 2. Motor 2 includes a housing 4 to which is mounted a stator 7. A rotor 9 rotates relative to stator 7 in response to an electro-motive force. Rotor 9 is supported by a shaft 12 that is rotatably mounted relative to housing 4. Shaft 12 includes a first end 14 that extends to a second end 16. First end 14 is rotatably supported by a first bearing 20 while second end 16 is rotatably supported by a second bearing 22. As will be detailed more fully below, first and second bearings 20 and 22 are monitored by a bearing monitoring system 26 that employs a fuzzy logic rule set to determine a possibility of a potential failure. First and second bearings could also be monitored to establish a ranking that rates bearing condition relative to other bearings in the rotating machine.

In accordance with an exemplary embodiment, bearing monitoring system 26 includes a first plurality of sensors 30-32 positioned to sense parameters associated with first bearing 20. Sensors 30-32 may include temperature sensors, vibration sensors, and overload sensors. A second plurality of sensors 36-38 are positioned to sense parameters associated with second bearing 22. In a manner similar to that described above, second plurality of sensors 36-38 may include temperature sensors, vibration sensors, and overload sensors. At this point it should be understood that the number, type, and number of each type of sensor may vary. First and second pluralities of sensors 30-32, and 36-38 are coupled to a sensor system 50 which, in the exemplary embodiment shown, is mounted to housing 4. As will be discussed more fully below, sensor system 50 collects bearing parameter data from first and second pluralities of sensors 30-32 and 36-38. Sensor system 50 also passes the bearing parameter data to a fuzzy logic enabled device (FLED) 60. Data may be transmitted either wirelessly through a wireless transmitter/receiver 61 arranged in sensor system 50 or through a direct link such as through a cable 62.

In further accordance with the exemplary embodiment, FLED 60 includes a controller 64 and a memory 66. Memory 66 stores a set of fuzzy logic rules that are applied to the bearing parameter data received from sensor system 50. FLED 60 also includes a wireless receiver/transmitter 68 that is configured to communicate with sensor system 50 through wireless transmitter 61 and a display 70 that is configured to display bearing health data. As will be discussed more fully below, FLED 60 receives data from sensors 30-32 and 36-38. The data the set of fuzzy logic rules is applied to the data to determine a projected health of each bearing 20 and 22.

Figure 2:
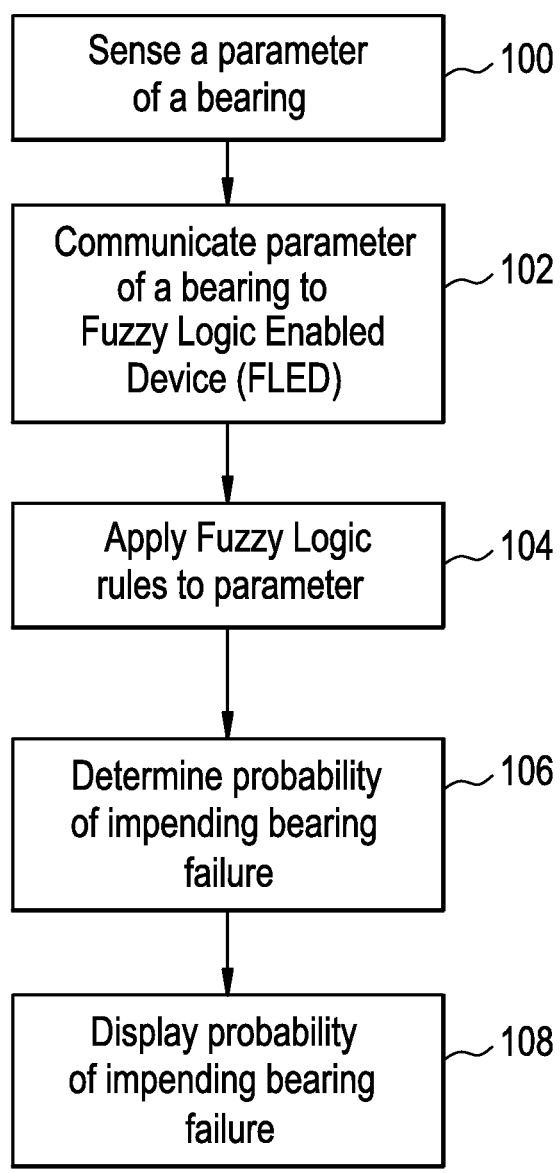
FIG. 2 is a flow chart illustrating a method for monitoring bearings using a fuzzy logic rule set in accordance with an exemplary embodiment.

Reference will now follow to FIG. 2 in describing a method of monitoring bearing health using a set of fuzzy logic rules in accordance with an exemplary embodiment. Initially, one or more bearing parameters such as temperature, vibration, and overload are sensed by sensors 30-32 and/or 36-38 as indicated in block 100. The one or more bearing parameters are communicated to FLED 60 as indicated in block 102. FLED 60 performs a data quality check, normalizing data from the sensor and applies a set of fuzzy logic rules to the one or more bearing parameters in block 104. At this point, FLED 60 determines a possibility of a potential failure to bearing 20 and/or bearing 22 in block 106 such as shown in Table 1 below. The possibility of potential bearing failure and/or a relative ranking of bearings 20 and 22 relative to each other and/or other bearings (not shown) in rotating machine 2 or other similar machines. The possibility of potential bearing failure and or ranking is communicated to and presented on display 70 as indicated in block 108.

TABLE 1

Rule Set for Bearing Health Monitoring

| Temperature | Overload | Vibration | Failure |
|---|---|---|---|
| Low | Low | Low | Low |
| Low | Low | Medium | Medium |
| Low | Low | High | High |
| Low | Medium | Low | Medium |
| Low | Medium | Medium | Medium |
| Low | Medium | High | High |
| Low | High | Low | High |
| Low | High | Medium | High |
| Low | High | High | High |
| Medium | Low | Low | Medium |
| Medium | Low | Medium | Medium |
| Medium | Low | High | High |
| Medium | Medium | Low | Medium |
| Medium | Medium | Medium | Medium |
| Medium | Medium | High | High |
| Medium | High | Low | High |
| Medium | High | Medium | High |
| Medium | High | High | High |
| High | Low | Low | High |
| High | Low | Medium | High |
| High | Low | High | High |
| High | Medium | Low | High |
| High | Medium | Medium | High |
| High | Medium | High | High |
| High | High | Low | High |
| High | High | Medium | High |
| High | High | High | Imminent |

At this point it should be understood that the exemplary embodiments provide a system and method for determining or predicating a potential failure of system components using a set of fuzzy logic rules. In contrast to existing systems that simply provide an indication of current component condition, the need for lubrication, or an immediate need for replacement, the exemplary embodiments, using the set of fuzzy logic rules predicts a likelihood of a potential component failure and/or rating the component relative to other components in the system or similar systems. In this manner, personnel can plan a preventative bearing replacement to avoid costly unplanned down times or damage associated with a bearing failure. It should also be understood that system is described in terms of monitoring bearings, adjustments to input parameters can be made such that the system can be employed to monitor a wide array of systems. For example, in a lubrication system, the fuzzy logic rules could be employed to monitor lubricant condition, or component condition using temperature parameters, current flow parameters and the like. The technical effect of the present invention achieves a technological contribution to monitoring systems by providing a flexible set of fuzzy logic rules that can receive different application or system specific inputs to monitor an overall condition of system components. The flexibility of the fuzzy logic rules achieves a monitoring system that can be readily adapted to multiple industries by providing industry or system specific inputs. In contrast to existing dedicated monitoring systems, the fuzzy logic rules are readily adaptable to a wide array of systems by providing system relevant variables as inputs to the fuzzy logic enabled device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A monitoring system comprising:
    at least one sensor; and
    a fuzzy logic enabled device operatively connected to the at least one sensor, the fuzzy logic enabled device including a fuzzy logic rule set, presented in the following table, Rule Set for Bearing Health Monitoring

| Temperature | Overload | Vibration | Failure |
|---|---|---|---|
| Low | Low | Low | Low |
| Low | Low | Medium | Medium |
| Low | Low | High | High |
| Low | Medium | Low | Medium |
| Low | Medium | Medium | Medium |
| Low | Medium | High | High |
| Low | High | Low | High |
| Low | High | Medium | High |
| Low | High | High | High |
| Medium | Low | Low | Medium |
| Medium | Low | Medium | Medium |
| Medium | Low | High | High |
| Medium | Medium | Low | Medium |
| Medium | Medium | Medium | Medium |
| Medium | Medium | High | High |
| Medium | High | Low | High |
| Medium | High | Medium | High |
| Medium | High | High | High |
| High | Low | Low | High |
| High | Low | Medium | High |
| High | Low | High | High |
| High | Medium | Low | High |
| High | Medium | Medium | High |
| High | Medium | High | High |
| High | High | Low | High |
| High | High | Medium | High |
| High | High | High | Imminent | that is configured and disposed to determine a component condition based on an input from the at least one sensor.

2. The monitoring system according to claim 1, wherein the at least one sensor includes one of a temperature sensor, a vibration sensor, and an overload sensor.

3. The monitoring system according to claim 1, wherein the at least one sensor includes two of a temperature sensor, a vibration sensor, and an overload sensor.

4. The monitoring system according to claim 1, wherein the at least one sensor includes each of a temperature sensor, a vibration sensor, and an overload sensor.

5. The monitoring system according to claim 1, wherein the sensor member includes a communication link coupled directly to the fuzzy logic enabled device.

6. The monitoring system according to claim 1, further comprising: a sensor system operatively coupled to the at least one sensor, the sensor system including a wireless transmitter operatively connected to the at least one sensor.

7. The monitoring system according to claim 6, wherein the fuzzy logic enabled device includes a wireless receiver configured and disposed to receive signals from the at least one sensor through the wireless transmitter.

8. The monitoring system according to claim 7, wherein the fuzzy logic enabled device comprises a web enabled device.

9. The monitoring system according to claim 8, wherein the web enabled device comprises a smart phone.

10. The monitoring system according to claim 1, wherein the at least one sensor is mounted relative to a bearing.

11. The monitoring system according to claim 10, wherein the fuzzy logic enabled device is configured and disposed to employ the fuzzy logic rule set to determine a possibility of potential bearing failure.

12. The monitoring system according to claim 11, wherein the possibility of the potential bearing failure includes one of a low possibility of an potential bearing failure, a medium possibility of an potential bearing failure, and a high possibility of an potential bearing failure.

13. The monitoring system according to claim 10, wherein the at least one sensor includes a first sensor mounted to a first component and a second sensor mounted to a second component.

14. The monitoring system according to claim 13, wherein the fuzzy logic enabled device is configured and disposed to employ the fuzzy logic rule set to rank a condition of the first component relative to a condition of the second component.

15. The monitoring system according to claim 1, wherein the fuzzy logic enabled device includes a visual output device configured and disposed to display a visual output representing the possibility of the potential bearing failure on the visual output device.

16. A method of monitoring component condition using a set of fuzzy logic rules, the method comprising:
sensing at least one parameter of a component;
passing the at least one parameter of the component to a fuzzy logic enabled device;
applying the set of fuzzy logic rules, set forth in following table,

| Rule Set for Bearing Health Monitoring | | | |
| --- | --- | --- | --- |
| Temperature | Overload | Vibration | Failure |
| Low | Low | Low | Low |
| Low | Low | Medium | Medium |
| Low | Low | High | High |
| Low | Medium | Low | Medium |
| Low | Medium | Medium | Medium |
| Low | Medium | High | High |
| Low | High | Low | High |
| Low | High | Medium | High |
| Low | High | High | High |
| Medium | Low | Low | Medium |
| Medium | Low | Medium | Medium |
| Medium | Low | High | High |
| Medium | Medium | Low | Medium |
| Medium | Medium | Medium | Medium |
| Medium | Medium | High | High |
| Medium | High | Low | High |
| Medium | High | Medium | High |
| Medium | High | High | High |
| High | Low | Low | High |
| High | Low | Medium | High |
| High | Low | High | High |
| High | Medium | Low | High |
| High | Medium | Medium | High |
| High | Medium | High | High |
| High | High | Low | High |
| High | High | Medium | High |
| High | High | High | Imminent | to the at least one parameter of the component; and
determining a component condition based on the at least one component parameter.

17. The method of claim 16, wherein sensing the at least one parameter of the component includes sensing one of a temperature parameter, a vibration parameter, and an overload parameter.

18. The method of claim 16, wherein sensing the at least one parameter of the component includes sensing at least two of a temperature parameter, a vibration parameter, and an overload parameter.

19. The method of claim 16, wherein sensing the at least one parameter of the component includes sensing each of a temperature parameter, a vibration parameter, and an overload parameter.

20. The method of claim 16, wherein determining a condition of the component includes determining a possibility of a potential component failure.

21. The method of claim 20, wherein determining a possibility of a potential component failure includes determining one of a low possibility of an potential component failure, a medium possibility of an potential component failure, and a high possibility of an potential component failure.

22. The method of claim 16, wherein passing the at least one parameter of the bearing includes wirelessly transmitting the at least one parameter of the bearing to the fuzzy logic enabled device.

23. The method of claim 16, wherein sensing the parameter of the component comprises sensing a parameter of a bearing.

24. The method of claim 23, wherein determining the component condition comprises determining a possibility of a potential failure of the bearing.

25. The method of claim 16, wherein sensing the parameter of the component comprises sensing a parameter of a first component and a parameter of a second component.

26. The method of claim 25, wherein determining the component condition comprises ranking a condition of the first component relative to a condition of the second component.

27. A motor system comprising:
a rotating shaft including a first end portion that extends to a second end portion through an intermediate portion;
a first bearing arranged at the first end portion of the shaft, and a second bearing arranged at the second end portion of the shaft; and
a bearing monitoring system operatively coupled to one of the first and second bearings, the bearing monitoring system including:
at least one sensor; and
a fuzzy logic enabled device operatively connected to the at least one sensor, the fuzzy logic enabled device including a fuzzy logic rule set, presented in Table 1,

TABLE 1

Rule Set for Bearing Health Monitoring

| Temperature | Overload | Vibration | Failure |
| --- | --- | --- | --- |
| Low | Low | Low | Low |
| Low | Low | Medium | Medium |
| Low | Low | High | High |
| Low | Medium | Low | Medium |
| Low | Medium | Medium | Medium |
| Low | Medium | High | High |
| Low | High | Low | High |
| Low | High | Medium | High |
| Low | High | High | High |
| Medium | Low | Low | Medium |
| Medium | Low | Medium | Medium |
| Medium | Low | High | High |
| Medium | Medium | Low | Medium |
| Medium | Medium | Medium | Medium |
| Medium | Medium | High | High |
| Medium | High | Low | High |
| Medium | High | Medium | High |
| Medium | High | High | High |
| High | Low | Low | High |
| High | Low | Medium | High |
| High | Low | High | High |
| High | Medium | Low | High |
| High | Medium | Medium | High |
| High | Medium | High | High |
| High | High | Low | High |
| High | High | Medium | High |
| High | High | High | Imminent | that is configured and disposed to determine a condition of at least one of the first and second bearing based on an input from the at least one sensor.

28. The motor system according to claim 27, wherein the at least one sensor includes each of a temperature sensor, a vibration sensor, and an overload sensor.

29. The motor system according to claim 27, wherein the fuzzy logic enabled device comprises a smart phone.

30. The motor system according to claim 27, wherein the fuzzy logic enabled device is configured and disposed to determine a possibility of failure of one of the first and second bearings.

31. The motor system according to claim 27, wherein the fuzzy logic enabled device is configured and disposed to rank a relative condition of the first bearing and the second bearing using the fuzzy logic rule set presented in Table 1

TABLE 1

Rule Set for Bearing Health Monitoring

| Temperature | Overload | Vibration | Failure |
| --- | --- | --- | --- |
| Low | Low | Low | Low |
| Low | Low | Medium | Medium |
| Low | Low | High | High |
| Low | Medium | Low | Medium |
| Low | Medium | Medium | Medium |
| Low | Medium | High | High |
| Low | High | Low | High |
| Low | High | Medium | High |
| Low | High | High | High |
| Medium | Low | Low | Medium |
| Medium | Low | Medium | Medium |
| Medium | Low | High | High |
| Medium | Medium | Low | Medium |
| Medium | Medium | Medium | Medium |
| Medium | Medium | High | High |
| Medium | High | Low | High |
| Medium | High | Medium | High |
| Medium | High | High | High |
| High | Low | Low | High |
| High | Low | Medium | High |
| High | Low | High | High |
| High | Medium | Low | High |
| High | Medium | Medium | High |
| High | Medium | High | High |
| High | High | Low | High |
| High | High | Medium | High |
| High | High | High | Imminent. |

* * * * *